(12) United States Patent
Lin

(10) Patent No.: US 6,615,453 B2
(45) Date of Patent: Sep. 9, 2003

(54) PUSH BUTTON ASSEMBLY

(75) Inventor: Wan Cheng Lin, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/749,028

(22) Filed: Dec. 26, 2000

(65) Prior Publication Data

US 2002/0070562 A1 Jun. 13, 2002

(30) Foreign Application Priority Data

Dec. 12, 2000 (TW) ...................................... 89221520 U

(51) Int. Cl.$^7$ ............................................. H01H 13/14
(52) U.S. Cl. ......................... 16/441; 200/341; 200/344
(58) Field of Search ............................ 16/441; 200/341, 200/343, 344, 345; 250/465.1; 116/172; 439/159; 312/9.11, 9.16, 9.19, 319.1

(56) References Cited

U.S. PATENT DOCUMENTS

| | | | | |
|---|---|---|---|---|
| 3,939,318 A | * | 2/1976 | Brown et al. | 200/341 |
| 4,392,037 A | * | 7/1983 | Fleming | 200/344 |
| 5,026,296 A | * | 6/1991 | Hashiguchi | 439/159 |
| 6,057,522 A | * | 5/2000 | Chao | 200/341 |
| 6,495,782 B1 | * | 12/2002 | Huang | 200/341 |

* cited by examiner

Primary Examiner—Anthony Knight
Assistant Examiner—Doug Hutton
(74) Attorney, Agent, or Firm—Wei Te Chung

(57) ABSTRACT

A push button assembly (30) includes a spring member (32) and a button (34). The spring member is secured to a computer bezel (10), and includes a rod (36), a pair of U-shaped crooks (38, 40), and a deformable arm (42) extending from one of the U-shaped crooks. The deformable arm includes a free end portion (48). The button is movably received in an aperture (16) of the bezel. The button defines a through hole (58) for movably receiving the free end portion of the spring member. Thus the button can move freely in the aperture of the bezel.

10 Claims, 4 Drawing Sheets

PUSH BUTTON ASSEMBLY

BACKGROUND OF THE INVENTION

1. Field of the Invention

The present invention relates to a push button assembly, and more particularly to a push button assembly for a computer bezel and a floppy disk drive.

2. Related Art

Personal computers usually include floppy disk drives (FDDs). A button assembly is generally used to eject a floppy disk (FD) from the FDD.

In FIG. 4, a conventional button assembly for an FDD is illustrated. A fixed member 2 secures a spring arm 5 to an outside of a computer bezel 3. A button 1 is integrally formed at an end of the spring arm 5, and is accommodated in a hole 6 defined in the bezel 3. When the button 1 is pushed inwardly, it touches the FDD and thereby causes the FD to slide out of the FDD. The button 1 then returns to its original position due to resiliency of the spring arm 5.

In such operation, the button 1 rotates about the fixed member 2. Because the button 1 travels along a curved path, it often interferes with the hole 6. Thus the button 1 does not always fully return to its original position (see FIG. 5), and subsequent operation of the assembly is impaired.

A reliable button assembly which overcomes the above problems of the related art is strongly desired.

SUMMARY OF THE INVENTION

Accordingly, an object of the present invention is to provide a button assembly which operates reliably.

To achieve the above-mentioned object, a push button assembly in accordance with the present invention comprises a spring member and a button. The spring member is secured to a computer bezel, and comprises a rod, a pair of U-shaped crooks, and a deformable arm extending from one of the U-shaped crooks. The deformable arm includes a free end portion. The button is movably received in an aperture of the bezel. The button defines a through hole therein for movably receiving the free end portion of the spring member. Thus the button can move freely in the aperture of the bezel.

Other objects, advantages and novel features of the present invention will be drawn from the following detailed embodiment of the present invention with attached drawings, in which:

DETAILED DESCRIPTION OF THE PREFERRED EMBODIMENT

Figure 1:
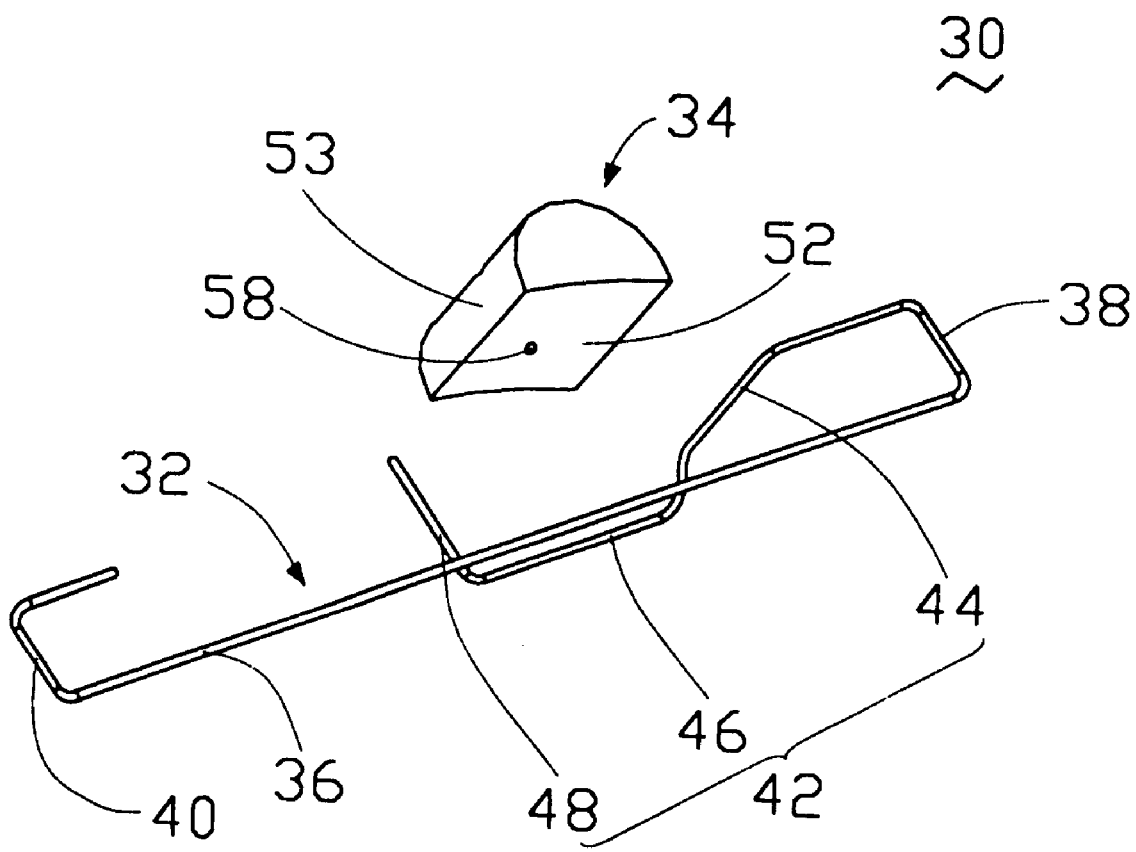
FIG. 1 is an exploded view of a button assembly in accordance with the present invention.

Referring to FIG. 1, a push button assembly 30 in accordance with the present invention comprises a spring member 32 and a button 34 movably engaged with the spring member 32.

The spring member 32 comprises a rod 36, a pair of U-shaped first and second crooks 38, 40 and a deformable arm 42. The first and second crooks 38, 40 extend back inwardly toward each other from respective opposite ends of the rod 36. The deformable arm 42 extends from a free end of the first crook 38, and comprises a connecting portion 44, a horizontal portion 46 and a free end portion 48. The connecting portion 44 connects the deformable arm 42 and the first crook 38. The connecting portion 44 extends from the free end of the first crook 38 in a direction toward the rod 36, and slants toward the computer bezel (see FIGS. 2 and 3). The horizontal portion 46 of the deformable arm 42 is parallel to the rod 36, and is located between the connecting portion 44 and the free end portion 48. The free end portion 48 is perpendicular to the horizontal portion 46.

The button 34 is substantially semi-cylindrical, and comprises a concave flank 52, a convex flank 53 and a through hole 58 defined between the concave flank 52 and the convex flank 53. A diameter of the through hole 58 is slightly larger than a diameter of the free end portion 48 of the deformable arm 42, so that the through hole 58 can movably receive the free end portion 48.

Figure 2:
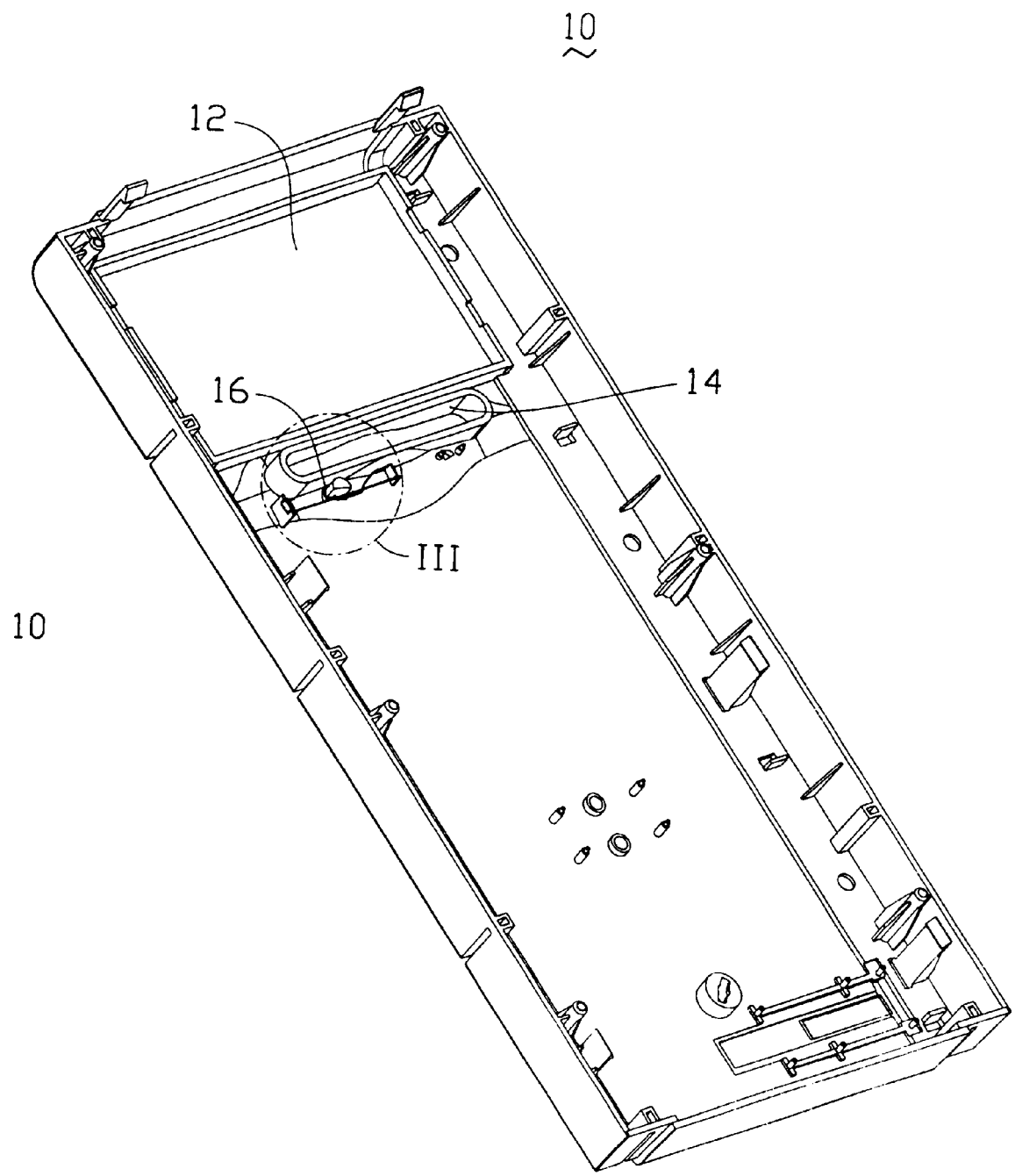
FIG. 2 is a view of the button assembly of FIG. 1 fully assembled and secured to a computer bezel.
Figure 3:
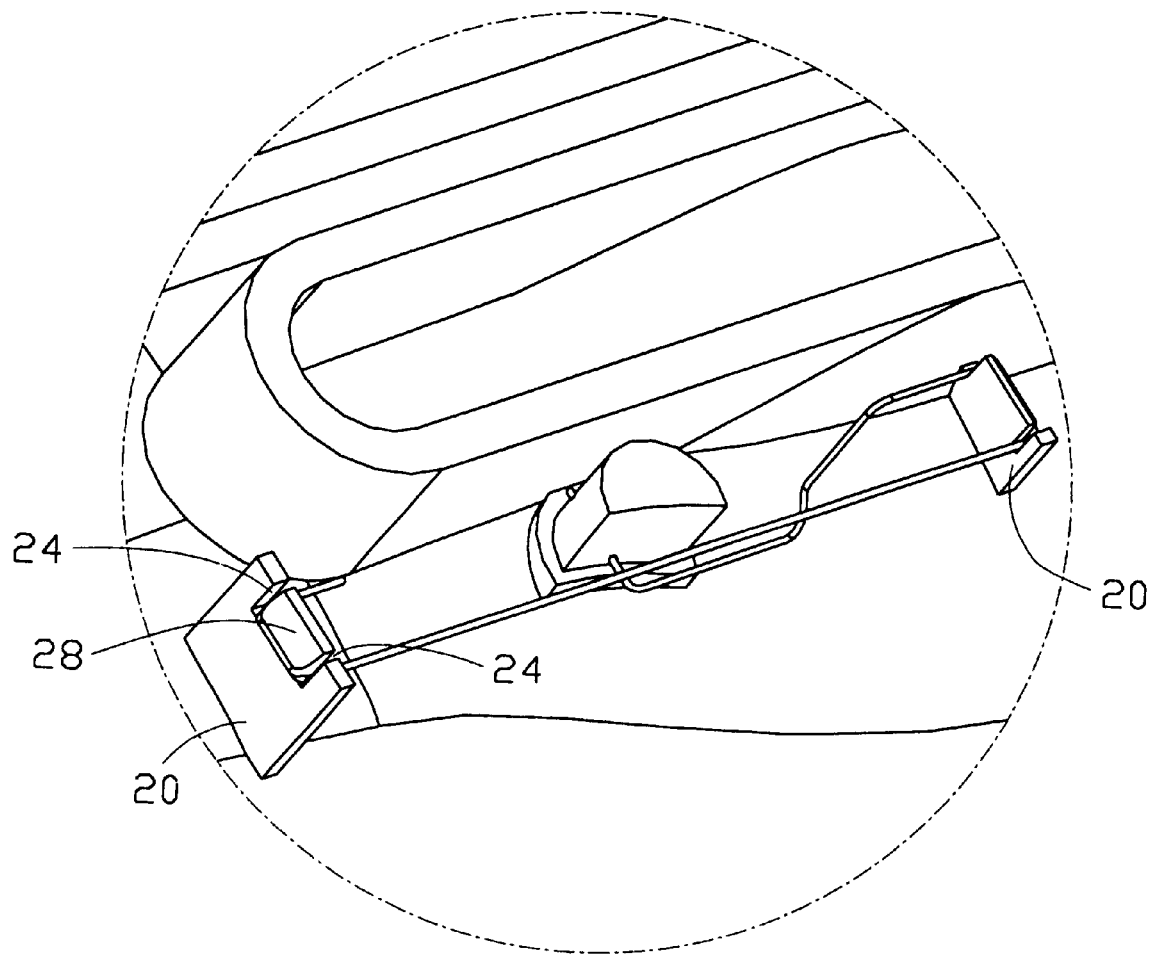
FIG. 3 is an enlarged view of the circled portion III of FIG. 2.
Figure 4:
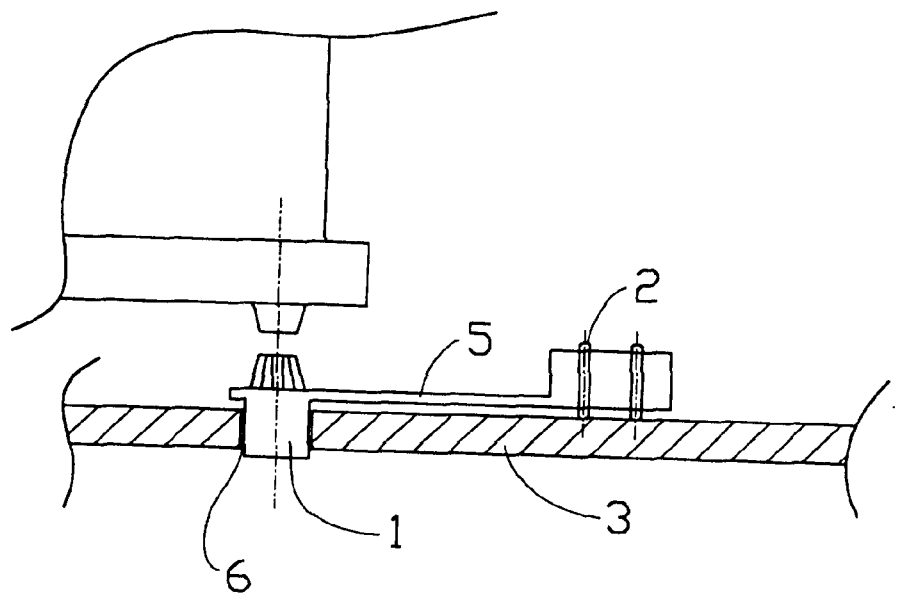
FIG. 4 is a cross-sectional view of a conventional button assembly.
Figure 5:
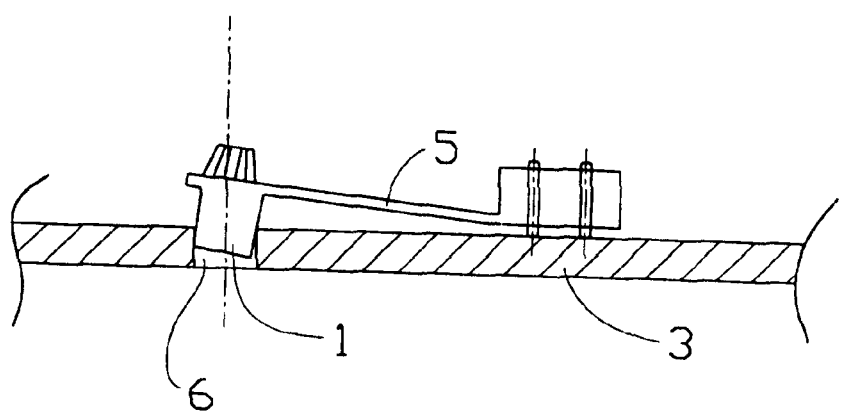
FIG. 5 is similar to FIG. 4; but showing a button of the button assembly unable to return to its original position.

Referring to FIG. 2, a computer bezel 10 defines an opening 12 and a horizontal slot 14 below the opening 12. The horizontal slot 14 provides access to a floppy disk drive (FDD) (not shown) installed adjacent the bezel 10. Referring particularly to FIG. 3, a pair of locking blocks 20 is formed inwardly from an inner surface of the bezel 10, below the slot 14. Each block 20 defines a pair of cutouts 24 in an inner edge thereof, and forms a catch 28 between the cutouts 24. Each catch 28 forms a lip (not labeled), for retaining the U-shaped crooks 38, 40 of the button assembly 30. An aperture 16 is defined in the bezel 10 between the locking blocks 20, for movably receiving the button 34 therein.

In assembly, the through hole 58 of the button 34 movably receives the free end portion 48 of the deformable arm 42. The button 34 is received in the aperture 16 of the bezel 10. The concave flank 52 of the button 34 confronts the rod 36 of the spring member 32. The U-shaped crooks 38, 40 of the button assembly 30 are inserted into the corresponding cutouts 24 of the locking blocks 20. The catches 28 of the locking blocks 20 retain the U-shaped crooks 38, 40 in the locking blocks 20. The spring member 32 of the button assembly 30 is thus secured to the bezel 10. The button assembly 30 is thereby positioned on the bezel 10.

The button assembly 30 of the present invention has at least the following advantages:

When the button 34 of the button assembly 30 is pressed inwardly, it causes the deformable arm 42 to deformably rotate about the locking block 20 at the first U-shaped crook 38. The diameter of the through hole 58 of the button 34 is slightly larger than that of the free end portion 48 of the deformable arm 42. Therefore, the button 34 rotates freely on the free end portion 48 of the deformable arm 42. This ensures that the button 34 moves freely in the aperture 16.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A push button assembly comprising:
   a spring member adapted to be secured to a computer bezel, the spring member comprising a rod, a pair of U-shaped crooks respectively extending inwardly toward each other from opposite ends of the rod for engaging with the bezel such that the button assembly is secured to the bezel and a deformable arm extending from one of the crooks, the deformable arm comprising a free end portion; and a button adapted for being movably received in an aperture of the bezel, the button defining a through hole therein for movably receiving the free end portion of the spring member;

wherein the free end portion of the deformable arm of the spring member is perpendicular to the rod.

2. The button assembly as claimed in claim 1, wherein the through hole of the button has a diameter slightly larger than a diameter of the free end portion of the spring member, for allowing the button to rotate freely about the free end portion.

3. The button assembly as claimed in claim 1, wherein the deformable arm of the spring member extends from one of the crooks toward the bezel.

4. The button assembly as claimed in claim 1, wherein the button is substantially semi-cylindrical and comprises a concave flank and a convex flank, and wherein the through hole is defined completely through the concave and convex flanks.

5. A bezel assembly comprising:

a computer bezel defining an aperture therein and forming a pair of locking blocks inwardly from an inner surface thereof;

a spring member secured to the locking blocks of the bezel, the spring member comprising a rod and a free end portion; and a button movably received in the aperture of the bezel, the button defining a through hole therein for receiving the free end portion of the spring member;

wherein the free end portion of the deformable arm of the spring member is perpendicular to the rod.

6. The bezel assembly as claimed in claim 5, wherein the through hole of the button has a diameter slightly larger than a diameter of the free end portion of the spring member, for allowing the button to rotate freely about the free end portion.

7. The bezel assembly as claimed in claim 5, wherein a pair of U-shaped crooks respectively extends from opposite ends of the rod of the spring member, and wherein each of the locking blocks defines a pair of cutouts therein for retaining the corresponding crook, whereby the spring member is secured to the bezel.

8. The bezel assembly as claimed in claim 7, wherein a deformable arm extends from one of the crooks toward the bezel, and wherein the deformable arm comprises the free end portion of the spring member.

9. A bezel assembly comprising:

a computer bezel defining an aperture therein and forming a pair of locking blocks inwardly from an inner surface thereof;

a spring member is secured to the bezel, the spring member comprising a rod and a free end portion; and a button movably received in the aperture of the bezel, the button defining a through hole therein for receiving the free end portion of the spring member;

wherein a pair of U-shaped crooks respectively extends from opposite ends of the rod of the spring member, and wherein each of the locking blocks defines a pair of cutouts therein for retaining the corresponding crook, whereby the spring member is secured to the bezel.

10. The bezel assembly as claimed in claim 9, wherein a deformable arm extends from one of the crooks toward the bezel, and wherein the deformable arm comprises the free end portion of the spring member.

* * * * *